UNITED STATES PATENT OFFICE 3,096,328
Patented July 2, 1963

3,096,328
ESTRADIOL DERIVATIVES
Poul Borrevang, Copenhagen, Denmark, assignor to Lovens Kemiske Fabrik ved A. Kongsted, Ballerup, Denmark, a firm
No Drawing. Filed July 3, 1961, Ser. No. 121,380
Claims priority, application Great Britain July 13, 1960
18 Claims. (Cl. 260—239.55)

This invention relates to hitherto unknown derivatives of estradiol and to a method for their production.

More specifically the invention relates to 17-hemiacetals and 17-hemiacetal esters of estradiol and certain of its derivatives, these new compounds having the general Formula I:

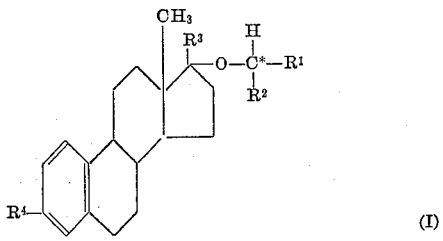

in which $R^1$ is a substituted alkyl group having from 1 to 4 carbon atoms in the carbon chain and being substituted with at least one halogen atom, $R^2$ is a member of the class consisting of a hydroxy group and ester groups, $R^3$ is a member of the class consisting of hydrogen, lower saturated alkyl groups and lower unsaturated alkyl groups, the said groups preferably containing not more than 3 carbon atoms, and $R^4$ is selected from the class consisting of a hydroxy group, alkoxy groups and ester groups.

In Formula I the asterisk emphasizing the carbon atom of the hemiacetal group indicates lack of symmetry in the said group. Accordingly, the compounds represented by Formula I may exist in two stereoisomeric forms, and the scope of the invention extends to the stereoisomers individually as well as to mixtures thereof.

The said stereoisomeric forms of the hemiacetals and hemiacetal esters of the invention are distinguishable by their melting-points, and where both stereoisomeric forms are described in the following, they will be designated as the "lower-melting" and the "higher-melting" form, respectively.

The compounds of the invention exert a varying degree of esterogenic activity, and where stereoisomery as mentioned before is involved, the two forms of the hemiacetal and hemiacetal ester in question have in some cases proved to differ to a certain degree in regard to estrogenic potency.

For therapeutic purposes, the compounds can be given orally or they can be administered as injections, for instance of aqueous crystal suspensions of the compound in question, for which latter purpose the hemiacetal esters are preferably used, since they are more stable in the presence of water, than are the hemiacetals themselves.

However, the compounds are preferably injected in the form of solutions or dispersions of the compound in a suitable oil, and for particular therapeutic purposes the pharmaceutical compositions mentioned may furthermore contain other desirable active components, as for instance testosterone derivatives.

According to tests carried out in connection with the invention, it has been found that when the 17-hydroxy group of estradiol or certain derivatives thereof is converted to a hemiacetal group or a hemiacetal ester group, many of the resulting compounds are capable of exerting a more protracted estrogenic effect than are the hitherto known estradiol derivatives when similarly administered as injections in one of the forms mentioned hereinbefore.

This has been demonstrated in animal experiments with castrated female rats, the duration of oestrus caused by a single injection of the derivative in question being used as a measure of the protracted effect.

In these experiments each animal out of three control groups received a subcutaneous injection of 500 micrograms of estradiol-cyclopentylpropionate, 100 micrograms of estradiol-valerinate and 100 micrograms of estradiol-dipropionate dissolved in oil respectively, and each animal of the test group received a subcutaneous injection of 100 micrograms of estradiol-17-chloral-hemiacetal diacetate (lower-melting form) dissolved in oil.

The figures in the table below indicate the number of days after which more than 50% of the animals in the group in question were still in oestrus, proving the superior protracted effect of estradiol-17-chloral-hemiacetal diacetate in comparison with the corresponding effect of the known derivatives used as test substances.

| Substance: | Number of days after which more than 50% of the animals were still in oestrus after a single injection |
|---|---|
| Estradiol - 17 - chloral-hemiacetal diacetate (M.P. 117–119° C.), 100 micrograms in oil | 40 |
| Estradiol-cyclopentylpropionate, 500 micrograms in oil | 0 |
| Estradiol-valerinate 100 micrograms in oil | 19 |
| Estradiol-dipropionate, 100 micrograms in oil | 15 |

The initial effect of the compounds of the invention depends in some degree on the form of administration used. Thus, by means of additional animal experiments carried out it was proved that the initial effect of estradiol-17-chloral-hemiacetal diacetate when administered subcutaneously amounted to only 40% of that observed after a similar treatment of the animals with estradiol-dipropionate, whereas the initial effect of an oral administration of the said hemiacetal was the double of that observed in the control group, the animals of which had been given ethinyl-estradiol orally in equal doses. In this connection it should be mentioned that ethinyl-estradiol is the preferred estrogenic drug for oral use.

It is further an object of the invention to provide a method of producing the estradiol-17-hemiacetals and -17-hemiacetal esters hereinbefore defined.

According to this method, estradiol or one of its derivatives, these steroids being represented by the general Formula II:

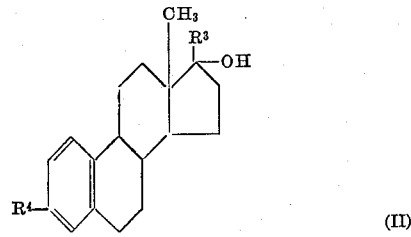

in which $R^3$ and $R^4$ have the meaning hereinbefore defined, is reacted with an aldehyde of the Formula III:

$$R^5.CHO$$

in which $R^5$ is an alkyl group having from 1 to 4 carbon atoms in the carbon chain and being substituted with at least one halogen atom, after which the hemiacetal obtained, or one of its stereoisomeric forms, is isolated and purified or, if esters are desired, the hemiacetal obtained by the aforesaid reaction is further reacted with an acylating agent containing the acyl group of the acid with which the said hemiacetal is to be esterified, after which the resulting hemiacetal ester, or one or both of its stereoisomeric forms, is isolated and purified, or the separated stereoisomeric forms of the free hemiacetal are esterified individually.

The reaction can be carried out in a dilute solution of the components, for instance by dissolving the steroid compound used as raw material in a suitable solvent, for which purpose for instance benzene, toluene, chloroform, ether, dioxane or pyridine and similar solvents have been found suitable.

Thereafter the mixture is left standing at a suitable temperature for the period of time required to accomplish the reaction. If the temperature is about 20 degrees centigrade, the reaction may be completed within a few hours or by standing overnight.

The aldehyde may be added in equivalent amounts to the 17-hydroxy group of the steroid used as a raw material, or there may be added an excess of the aldehyde, in which case the free hydroxy group present in the 3-position of the steroid molecule will remain unaffected by the influence of the aldehyde. Moreover, the aldehyde can be used in the form of one of its reactive derivatives, and for this purpose especially the hydrates are suitable. Thus for instance, chloral hydrate may conveniently be substituted for chloral in the method of the invention.

If the reaction is performed as described hereinbefore, the steroid used as raw material will usually dissolve in the reaction mixture after shaking for a while. During the reaction the hemiacetal may precipitate or it can be precipitated after conclusion of the reaction by adding to the mixture a component which reduces the solubility of the reaction product.

The reaction may result in substantial yields of both stereoisomeric forms of the hemiacetal in question, in which case these may be separated, for instance by exposing the crude hemiacetal thus precipitated to several subsequent crystallizations and using for this purpose suitable solvents or mixtures of solvents, by which at least one of the two forms is obtained, and, if desired, the other form can be isolated by evaporating the mother liquors and purifying the residue.

However, in the said reaction also one of the two possible stereoisomeric forms may be produced in a predominant yield, which may result in this form being obtained as the only reaction product, for instance when minor amounts of the other form is lost in the reaction mixture from which the hemiacetal is precipitated. In that case, the product which precipitates from the reaction mixture is easily purified by a simple crystallization.

The process of separating the two stereoisomeric forms or the process of purification is in some cases facilitated by esterifying the free hydroxy group contained in the hemiacetal group before performing one or both of the said processes, the esters being in many cases capable of crystallizing more easily than the corresponding free hemiacetals.

Moreover, some esters possess properties which are useful for particular therapeutic purposes, the utilization of the physiological activity of a steroid compound depending in many cases on the form of administration used.

Thus, by esterification of the free hydroxy group of the hemiacetal group, slightly water-soluble esters can be formed which, for instance, are specially suitable as components of aqueous crystal suspensions for injection as has been mentioned previously.

On the other hand, by esterification of the free hydroxy group of the hemiacetal group with for instance amino acids or one of the carboxylic groups of succinic acid, esters are produced the salts of which with acids or bases respectively are readily soluble in water.

The acid groups preferred as constituents of hemiacetal esters produced by the method of the invention are for instance the formyl, acetyl, propionyl, butyryl, isobutyryl, cyclopentyl-propionyl, benzoyl, phenyl-propionyl, furoyl, enanthyl, glycyl, succinyl, and glutaryl or similar groups.

In a particular embodiment of the invention, hemiacetal esters containing a free hydroxy group in the 3-position of the steroid molecule can be produced by protecting the said hydroxy group by converting it to one of its easily decomposable ethers, as for instance the dihydropyranyl ether, before performing the esterification, after which the 3-hydroxy group can be liberated without affecting the hemiacetal ester produced.

The invention will now be illustrated by the following examples, where temperatures are in degrees centigrade.

EXAMPLE 1

*Estradiol-17-Chloral-Hemiacetal*

To 2.5 g. of estradiol were added 10 ml. of anhydrous chloral. After shaking for a short time, a clear brownish solution was obtained, which was left standing at room temperature for 17 hours. Thereafter the solution was poured into water, and the resulting mixture was extracted with ether. The etheral phase was washed 5 times with water, dried over $Na_2SO_4$, and the ether was distilled off in vacuo on a water-bath. The partly crystalline residue was dissolved by heating in ethyl acetate, and after standing in an ice-box the crystals, which had precipitated, were filtered off and washed with a little petrolether. By this procedure 1.2 g. of the desired substance were obtained after drying. By adding petrolether to the mother liquor further 0.6 g. could be obtained. After recrystallization from ethyl acetate the substance had a melting point of 182–183°. The ultraviolet spectrum showed a maximum at 281 m$\mu$ (in ethanol) ($\epsilon$=2100).

Calculated: C, 57.22; H, 6.00; Cl, 25.34. Found: C, 57.28; H, 6.24; Cl, 25.19.

EXAMPLE 2

*Estradiol-17-Choral-Hemiacetal Diacetate (Low-Melting Form)*

2.0 g. of estradiol-17-chloral-hemiacetal were dissolved in a mixture of 6 ml. of dry pyridine and 6 ml. of acetic anhydride. After standing for 17 hours at room temperature, the mixture was evaporated to dryness in vacuo on a steam-bath. The partly crystalline residue was dissolved by heating in methanol, and after standing in an ice-box the crystals, which had precipitated, were filtered off and washed with a little of methanol. By this procedure 1.8 g. of the desired substance was obtained after drying at room temperature. By recrystallization from methanol the substance had a melting-point of 117–119°.

Calculated: C, 57.21; H, 5.80; Cl, 21.11. Found: C, 57.30; H, 6.01; Cl, 21.31.

EXAMPLE 3

*Estradiol-17-Choral-Hemiacetal Diacetate*

130 g. of estradiol were treated with 520 g. of anhydrous chloral as described in Example 1. After evaporation of the ether, the substance was not recrystallized from ethyl acetate, but the residue was heated with benzene. After cooling, a raw product of estradiol-17-chloral-hemiacetal was obtained with melting-point 161–168°, in total 174 g. After adding 500 ml. of acetic anhydride and 500 ml. of pyridine, the mixture was left standing at room temperature till next day and thereafter evaporated in vacuo. The residue was recrystallized from methanol, whereby 178 g. were obtained with melting-point 106–110°. After recrystallization from methanol, 135 g. of the above mentioned substance were obtained, which was identical with the substance described in Example 2. Melting-point 117–119°. By evaporation of the mother liquor, 20 g. of the substance were obtained, which melted at 155–158°. A recrystallization from ethyl acetate raised the melting-point to 161–162°. This substance is a high-melting isomer of estradiol-chloral-hemiacetal diacetate and identical with the substance produced according to Example 5.

EXAMPLE 4

*Estradiol-3-Acetate-17-Chloral-Hemiacetal*

To 1.4 g. of estradiol-3-acetate (produced by reduction of estrone acetate with $NaBH_4$ in methanol) was added 0.7 g. of anhydrous chloral, and after standing for 4 hours at room temperature, petrolether was added; the substance, which separated, was filtered off and dried, by which 1.4 g. of the above-mentioned substance was obtained with a melting-point of 135–136°.

Calculated: C, 57.22; H, 5.89; Cl, 23.03. Found: C, 56.99; H, 5.77; Cl, 23.20.

EXAMPLE 5

*Estradiol-17-Chloral-Hemiacetal Diacetate (Higher-Melting Form)*

Estradiol-3-acetate-17-chloral-hemiacetal produced as described in Example 4 was acetylated with acetic anhydride and pyridine as stated in Example 2, and after recrystallization from ethyl acetate the above-mentioned substance was obtained with melting-point 162–163°.

Calculated: C, 57.21; H, 5.80; Cl. 21.11. Found: C, 57.14; H, 5.97; Cl, 21.20.

EXAMPLE 6

*Estradiol-3-Acetate-17-Chloral-Hemiacetal Formate*

1.5 g. of estradiol-3-acetate-17-chloral-hemiacetal (produced as described in Example 4) were dissolved in 7.5 ml. of pyridine, after which a 24 hours old mixture of 4.5 ml. acetic anhydride and 1.6 ml. of formic acid was added. After standing for 5 hours at room temperature the mixture was evaporated to dryness in vacuo. The residue was recrystallized from methanol and subsequently from ethanol. Melting-point at 164–166°.

Calculated: C, 56.39; H, 5.56; Cl, 21.72. Found: C, 56.48; H, 5.54; Cl, 21.85.

EXAMPLE 7

*Estradiol-3-Benzoate-17-Chloral-Hemiacetal*

3.8 g. of estradiol-3-benzoate were added to a solution of 1.7 g. of anhydrous chloral in 10 ml. of dry benzene. After stirring for about 30 minutes, a clear solution was obtained, and thereafter the solution was left standing at room temperature for 3 hours. By adding 10 ml. of petrolether the solution solidified. After standing for 1 hour in an ice-box the substance was filtered off and washed with a mixture of 5 ml. of benzene and 5 ml. of petrolether and finally with petrolether. After drying at room temperature 4.3 g. of the desired substance were obtained. By dissolving in ethyl acetate and adding petrolether, the analytically pure product crystallized with a melting-point of 154–157°. The ultra-violet spectrum showed a maximum at 232 m$\mu$ (in ethanol), $\epsilon$=18,800.

Calculated: C, 61.90; H, 5.58; Cl, 20.30. Found: C, 62.02; H, 5.58; Cl, 20.26.

EXAMPLE 8

*Estradiol-3-Benzoate-17-Chloral-Hemiacetal Acetate*

4.3 g. of estradiol-3-benzoate-17-chloral-hemiacetal prepared in the manner described in Example 3 were dissolved in a mixture of 12.5 ml. of dry pyridine and 12.5 ml. of acetic anhydride. After standing for 17 hours at room temperature the mixture was evaporated to dryness in vacuo on a steam-bath. The partly crystalline residue was refluxed for 10 minutes with methanol and, after standing in an ice-box, the substance was filtered off and washed with a little of methanol. After drying at room temperature 3.8 g. of the desired substance were obtained by this method. After recrystallization from 99% ethanol, the melting-point was 131–138°. The ultra-violet spectrum showed a maximum at 231 m$\mu$ (in ethanol), $\epsilon$=19,100.

Calculated: C, 61.55; H, 5.52; Cl, 18.79. Found: C, 61.46; H, 5.57; Cl, 18.65.

EXAMPLE 9

*Estradiol-17-Chloral-Hemiacetal-Dibenzoate*

2 g. of estradiol-3-benzoate-17-chloral-hemiacetal (produced as described in Example 7) were dissolved in 10 ml. of pyridine, and to the solution 1.4 ml. of benzoyl chloride was added dropwise under ice-cooling. After standing for 16 hours at 2°, 50 ml. of ether were added together with 50 ml. of ethyl acetate. The organic phase was washed with the following aqueous solutions: 2×50 ml. of 4 n H$_2$SO$_4$, 50 ml. of H$_2$O, 2×50 ml. of ice-cold 2 n NaOH and 3×50 ml. of H$_2$O; after drying over anhydrous sodium sulphate, the solution was evaporated to dryness in vacuo. The residue was dissolved in methanol, and by cooling crystals were obtained with melting-point 142–157° (substance I). By evaporating the methanol and cooling, a substance II was obtained with melting-point 116–128°.

Substance I was recrystallized from ethyl acetate, by which estradiol-17-chloral-hemiacetal dibenzoate (high-melting isomer) was obtained with melting-point 177–178°. [$\alpha$]$_D^{20}$=+6.3° (chloroform).

Calculated: C, 65.02; H, 5.30; Cl, 16.94. Found: C, 64.83; H, 5.41; Cl, 17.01.

Substance II was recrystallized from methanol, by which the low-melting isomer of estradiol-17-chloral-hemiacetal dibenzoate was obtained with melting-point 177–178°. [$\alpha$]$_D^{20}$=+38.5° (chloroform).

Calculated: C, 65.02; H, 5.30; Cl, 16.94. Found: C, 65.11; H, 5.54; Cl, 17.05.

EXAMPLE 10

*Estradiol-17-Chloral-Hemiacetal Dibenzoate (High-Melting Isomer)*

2 g. of estradiol-17-chloral-hemiacetal (produced as described in Example 1) were benzoylated as described in Example 9. After evaporation of the solvents a crystalline residue was obtained which after recrystallization from ethyl acetate yielded a high-melting isomer with M.P. 176–178°, which was identical with that described in Example 9.

EXAMPLE 11

*Estradiol-17-Chloral-Hemiacetal Diformate*

2.4 g. of estradiol-17-chloral-hemiacetal prepared as described in Example 1 were dissolved in 12 ml. of pyridine, and after cooling to 0°, a 16-hour-old mixture of 11.2 ml. of acetic anhydride and 4.2 ml. of formic acid was added. After standing for 5 hours at 2°, the mixture was evaporated to dryness in vacuo, and the residue was recrystallized from methanol, thus yielding 2.2 g. of the above-mentioned compound with M.P. 138–140°.

The analytical sample was obtained by recrystallization from 96% ethanol. M.P. 142–143°.

Calculated: C, 55.53; H, 5.30; Cl, 22.36. Found: C, 55.53; H, 5.45; Cl, 22.57.

EXAMPLE 12

*Estradiol-17-Chloral-Hemiacetal Difuranate*

1.4 g. of estradiol-17-chloral-hemiacetal (produced as described in Example 1) were dissolved in 5 ml. of pyridine and cooled to 0°, after which 1.0 g. of 2-furoyl chloride was added dropwise. The mixture remained at 2° for 20 hours, after which 50 ml. of ethyl acetate and 50 ml. of ether was added, and the solution was shaken with dilute sulphuric acid, then with a cold NaOH-solution, and finally with water. After drying over Na$_2$SO$_4$, the solution was evaporated to dryness in vacuo, the crystalline residue was crystallized from methanol, and after recrystallization from acetone the above-mentioned substance was obtained with M.P. 213–216°, ultra-violet spectrum max. at 259 m$\mu$ ($\epsilon$=34,400).

Calculated: C, 59.27; H, 4.81; Cl, 17.50. Found: C, 59.12; H, 4.84; Cl, 17.65.

EXAMPLE 13

*Estradiol-3-Acetate-17-Butylchloral-Hemiacetal*

2.4 g. of estradiol-3-acetate were added to a solution of 1.5 g. of butyl chloral ($\alpha,\alpha,\beta$-trichlorobutyraldehyde)

in 15 ml. of dry benzene, after which the mixture was shaken until complete solution, after which the mixture was left standing at room temperature for 3 hours. The mixture was then poured into 75 ml. of petrolether, the substance which separated was filtered off, and after recrystallization from ethyl acetate the above-mentioned substance was obtained with M.P. 171–175.

Calculated: C, 58.84; H, 6.38; Cl, 21.72. Found: C, 58.96; H, 6.49; Cl, 21.54.

EXAMPLE 14

*Estradiol-17-Butylchloral-Hemiacetal Diacetate*

By acetylating estradiol-3-acetate-17-butylchloral-hemiacetal with pyridine and acetic anhydride as stated in Example 2, the above-named substance was obtained, which after recrystallization from methanol had melting-point 144–147°.

Calculated: C, 58.71; H, 6.25; Cl, 20.00. Found: C, 58.57; H, 6.38; Cl, 20.16.

What is claimed is:

1. Novel estradiol derivatives having the general formula:

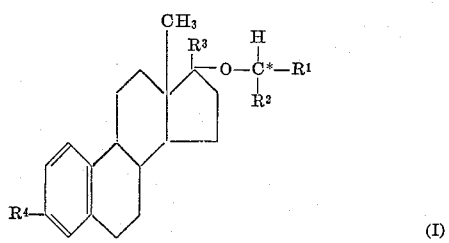

(I)

as the individual isomers and mixtures thereof, in which formula $R^1$ is a substituted alkyl group having from 1 to 4 carbon atoms in the carbon chain and being substituted with at least one chlorine atom, and $R^2$ and $R^4$ are selected from the class consisting of a hydroxy group, and its esters with an acid group selected from the group consisting of formyl, acetyl, propionyl, butyryl, isobutyryl, cyclopentyl-propionyl, benzoyl, phenyl-propionyl, furoyl, enanthyl, glycyl, succinyl, and glutaryl groups, and where the isomery is due to the carbon atom of the hemiacetal group which is indicated by an asterisk.

2. A compound selected from the group consisting of estradiol-17-chloral-hemiacetals and their hemiacetal esters with an acid group selected from the group consisting of formyl, acetyl, propionyl, butyryl, isobutyryl, cyclopentyl-propionyl, benzoyl, phenyl-propionyl, furoyl, enanthyl, glycyl, succinyl, and glutaryl groups.

3. A compound selected from the group consisting of estradiol-3-acyl-17-chloral-hemiacetals and their 3-acyl-17-hemiacetal-diesters with an acid group selected from the group consisting of formyl, acetyl, propionyl, butyryl, isobutyryl, cyclopentyl-propionyl, benzoyl, phenyl-propionyl, furoyl, enanthyl, glycyl, succinyl, and glutaryl groups.

4. Estradiol-3-acetate-17-chloral-hemiacetals.
5. Estradiol-3-benzoate-17-chloral hemiacetal.
6. Estradiol-3-formate-17-chloral-hemiacetal formate.
7. Estradiol-3-acetate-17-chloral-hemiacetal acetate.
8. Estradiol-3-acetate-17-chloral-hemiacetal formate.
9. Estradiol-3-benzoate-17-chloral hemiacetal acetate.
10. Estradiol-3-benzoate-17-chloral-hemiacetal benzoate.
11. Estradiol-3-furanate-17-chloral-hemiacetal furanate.
12. A compound selected from the group consisting of estradiol-3-acyl-17-butylchloral-hemiacetal their 3 - acyl-17-hemiacetal-diesters with an acid group selected from the group consisting of formyl, acetyl, propionyl, butyryl, isobutyryl, cyclopentyl-propionyl, benzoyl, phenyl-propionyl, furoyl, enanthyl, glycyl, succinyl, and glutaryl groups.
13. Estradiol-3-acetate-17-butyl-choral-hemiacetal acetate.
14. The high-melting stereoisomeric form of the estradiol derivative as set forth in claim 1 being estradiol-3-acetate-17-chloral-hemiacetal acetate in which $R^1$ is $CCl_3$ and $R^2$ is acetate, and the melting point is 162–63° C.
15. The high-melting stereoisomeric form of the estradiol derivative as set forth in claim 1 being estradiol-3-benzoate-17-chloral-hemiacetal benzoate in which $R^1$ is $CCl_3$ and $R^2$ is benzoate, the melting point is 177–78° C., and the rotation is +6.3 (chloroform).
16. The low-melting stereoisomeric form of the estradiol derivative as set forth in claim 1 being estradiol-3-acetate-17-chloral-hemiacetal acetate in which $R^1$ is $CCl_3$ and $R^2$ is acetate, and the melting point is 117 to 119° C.
17. The low-melting stereoisomeric form of the estradiol derivative as set forth in claim 1 being estradiol-3-benzoate-17-chloral-hemiacetal benzoate in which $R^1$ is $CCl_3$ and $R^2$ is benzoate, the melting point is 177–78° C. and the rotation is 38.5 (chloroform).
18. A method of producing the compounds of claim 1, in which a steroid represented by the general structural formula:

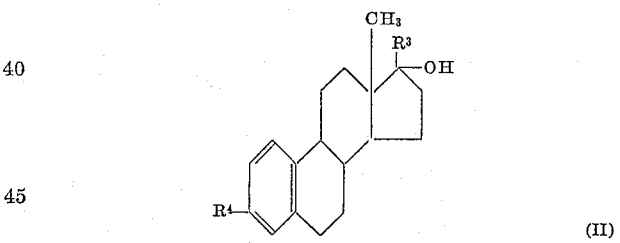

(II)

wherein $R^3$ is hydrogen, and $R^4$ is selected from the class consisting of a hydroxy group, and ester groups, is reacted with an aldehyde of the formula:

$$R^5.CHO \qquad (III)$$

in which $R^5$ is an alkyl group having from 1 to 4 carbon atoms in the carbon chain, the said alkyl group being substituted with at least one chlorine atom, after which the hemiacetal formed is recovered and purified, and, when esters are desired, the hemiacetal obtained by the aforesaid reaction is further reacted with an acylating agent in order to introduce the desired ester groups.

No references cited.